United States Patent Office
3,202,911
Patented Aug. 24, 1965

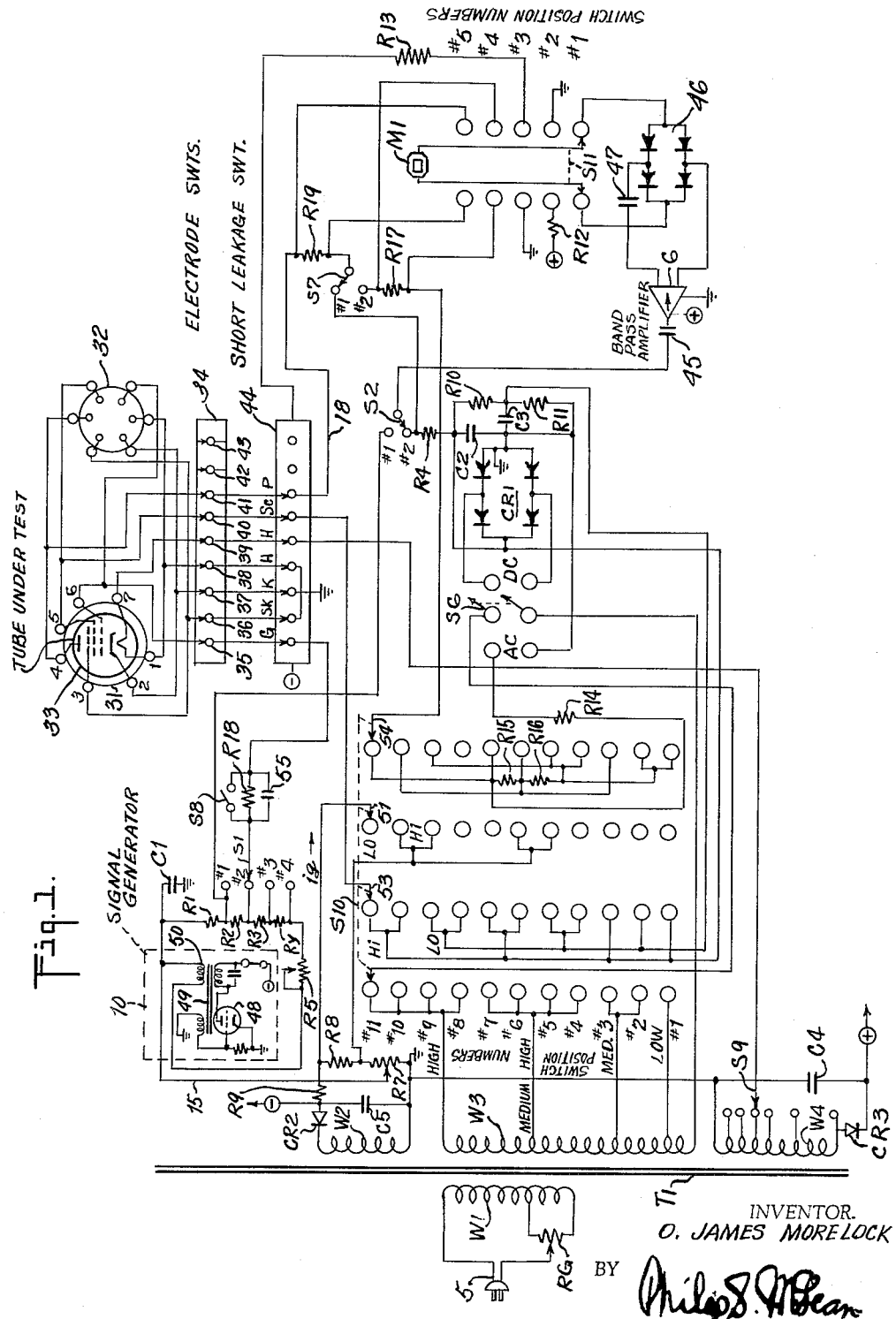

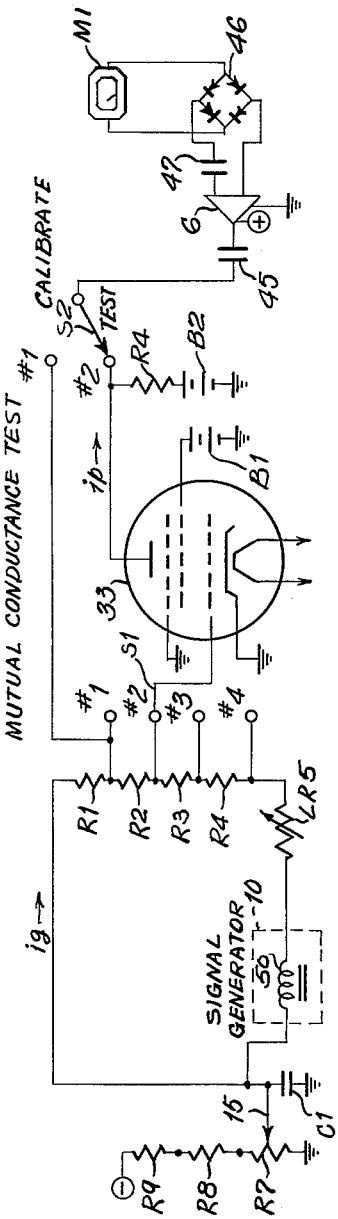
Fig.2. MUTUAL CONDUCTANCE TEST
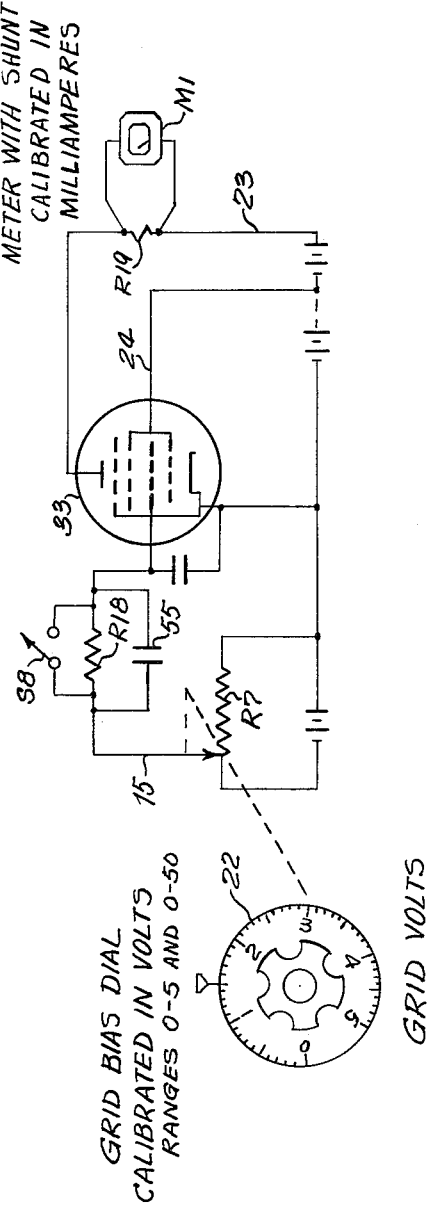
Fig.3. GRID CURRENT TEST

1

3,202,911
PORTABLE APPARATUS FOR TESTING
VACUUM TUBES
O. James Morelock, Box 348, Millington, N.J.
Filed Sept. 16, 1959, Ser. No. 840,414
9 Claims. (Cl. 324—23)

The present invention relates to testing apparatus for measuring the mutual conductance and other characteristics of commercial receiving and other low power vacuum tubes.

The measuring instrument of the present invention is so arranged that it may be embodied in a light weight portable device adapted for energization from the usual commercial alternating current supply. When thus energized, considerations of available space, simplicity of operation and maximum permissible weight limit the number of panel meters, adjustable power supplies and controls that can be included in a practical design. Also, these same considerations prevent the provision of sufficient filtering in the rectifier circuits to eliminate all effective power line ripple from the measuring circuits.

Present tube testers in the portable classification apply alternating current potential or pulsating unilateral potential to the anode of the vacuum tube undergoing test. The inherent voltage fluctuations prevent accurate measurement of mutual conductance where, by definition, constant and effectively non-fluctuating D.C. plate potential is required resulting in a D.C. unvarying plate current which is altered by the application of a test signal or change in control grid potential and the determination of the corresponding plate signal current or plate altered D.C. current. It is therefore very difficult to obtain good correlation between mutual conductance measurements obtained from portable testers using alternating current or unidirectionally pulsating potentials in the anode test circuits, and measurements for the same tubes using laboratory type standard mutual conductance apparatus where constant non-fluctuating biasing and anode potentials are employed. This is because the alternating current and pulsating current testers operate only intermittently during successive half-wave intervals and do not utilize any particular portion of the tube characteristic. The electrode potentials applied to the tube under test rise from zero with correct operative polarity passing through a peak and returning through zero to a half-wave interval of inoperativeness during which the power supply has the incorrect polarity.

Also present tube testers in the portable classification do not operate at grid signal levels equivalent to those used in standard non-portable apparatus. A considerably larger signal has been necessary in the portable apparatus due to inefficient operation of the tube under test and to insufficient sensitivity in the plate circuit signal current indicator.

An object of the present invention is to provide vacuum tube measuring apparatus of the light weight portable type that will afford a direct reading of mutual conductance micromhos without extensive manual adjustments. An object is to provide a portable test circuit that includes a calibration circuit and which will accurately read and consistently repeat mutual conductance measurements. A further object of the invention is to provide a sensitive micromho meter that will accurately read in terms of microamperes per volt the total actual effective increase in the plate current produced solely by a test signal voltage applied to the grid without error introduced by unfiltered components of the energizing potentials applied to the tube.

Another object of the invention is to provide a portable vacuum tube testing device with suitable partially filtered direct current power supplies to adequately energize the tube electrodes continuously in the proper portions of their operating characteristics. Another object is to provide a simplified circuit wherein a minimum number of voltage controls are necessary to correctly apply the energizing potentials in accordance with the listed values given in the specifications of the tube manufacturer.

A further important object of the invention is to provide a light weight portable device that will measure the mutual conductance, plate current and grid current of a vacuum tube under test at actual operational signal levels with continuously applied partially filtered electrode potentials which are effectively equal to or close to those imposed on a tube in the large bridge type and direct reading standard tube testers, thus providing good correlation of "in the field" with laboratory readings.

These and other objects and the advantages of the invention will be apparent from the following specification when taken with the accompanying drawings in which:

FIG. 1 is a circuit diagram of a mutual conductance measuring apparatus embodying the invention;

FIG. 2 is a simplified circuit diagram showing the relevant circuit elements of FIG. 1 connected to measure the mutual conductance of a typical receiving type vacuum tube;

FIG. 3 is a simplified circuit showing the method of measuring grid current;

Referring to FIG. 1, the testing apparatus comprises a plurality of sockets each constructed to receive a particular type of vacuum tube base, the sockets being selected to accommodate a wide variety of receiving type vacuum tubes in general commercial use. For simplicity of illustration, only a socket 31 for seven-pin tubes and a socket 32 for six-pin tubes have been shown in FIG. 1.

A pentode 33 is shown as the tube under test and is positioned in the socket 31 for seven-pin tubes. A group 34 of nine electrode switches 35–43 is connected to all of the sockets. Each of the electrode switches 35–43 is preferably a single pole twelve position switch and each of the switches is separately associated with a particular terminal in all of the sockets. The twelve positions are designated zero through nine, X and Y.

There is a roll chart (not shown) mounted in the case of the instrument which shows the required settings of the nine switches 35–43 for each tube listed. Where there is no electrode associated with a particular pin or where there is no pin, the corresponding electrode switch is turned to its zero position which completely disconnects the switch and the corresponding terminals of those sockets with which it is associated from the test circuit.

In each of its several positions, each of the switches 35–43 will select its particular socket terminal for operation as a filament or heater terminal, a cathode terminal, a plate terminal, grid terminal, screen grid terminal, suppressor grid terminal, etc. Thus, regardless of how the electrodes in the tube in a particular socket are connected to the pins of its base, the electrode switch settings taken from the chart will connect it correctly to the testing circuit. A special auxiliary switch (not shown) provides for tubes which have two plates and a common cathode or a twin triode with two plates and two cathodes so that the two portions of the tube may be separately tested.

The tube electrodes are connected through a nine pole six position short-leakage switch 44 to the other portions of the test circuit. In the position shown in FIG. 1, the electrodes are connected for mutual conductance and other tests. When turned from this position indicated, as described in greater detail below, the D.C. microammeter M is connected in an ohmmeter circuit which, for different positions of switch 44, measures the leakage resistance between heater and cathode and the leakage resistance between a selected individual electrode and all the other electrodes connected together.

The test circuit comprises a power transformer $T_1$ which has a primary winding $W_1$ for connection to the conventional light and power circuit by a cord and plug 5 and secondary windings $W_4$, $W_2$, and $W_3$ for heater, D.C. grid and D.C. anode energizing circuits, respectively. A signal generator 10 superimposes a signal of adjusted amplitude upon the control grid lead 15 along with a negative biasing potential derived from a potentiometer $R_7$. A band-pass amplifier 6, is tuned to pass the output frequency of signal generator 10. The amplifier 6 is connected through a coupling capacitor 45 to read the signal voltage across a load resistor $R_4$ with switches $S_2$ and $S_7$ in their No. 2 and No. 1 positions, respectively, as shown. The plate lead 18 is energized to provide anode potential by a full-wave rectifier $CR_1$ through the load resistor $R_4$ in series with a resistor of low resistance $R_9$. For certain tests, described below, the resistor $R_9$ is connected as a shunt for the meter $M_1$ by switches $S_7$ and $S_{11}$. A full wave rectifier 46 is connected through a coupling capacitor 47 to the output of the amplifier 6. With switch $S_{11}$ in its No. 1 position, as shown, the signal produced component of the plate current which appears as a voltage of the signal generator frequency across the load resistor $R_4$ and, after amplification by the band pass amplifier 6, is rectified by the rectifier 46 so that a current of corresponding magnitude is indicated by the meter $M_1$. With switch $S_2$ moved to its No. 1 position, the amplifier detector 6, 46 is connected to read the signal voltage across a calibration resistor $R_1$ and an output control resistor $R_5$ associated with signal generator 10 is adjusted to bring the pointer of meter $M_1$ to the calibration mark. The signal generator 10 and amplifier-detector 6, 46 receive their energizing potentials from the D.C. supply designated +. This + supply is obtained from a half-wave rectifier $CR_3$ energized by the full voltage of transformer secondary winding $W_4$ and filtered by a capacitor $C_4$. The negative voltage for the leakage switch 44 is designated — and is derived from the transformer secondary winding $W_2$ through a half-wave rectifier $CR_2$, a filter capacitor $C_5$ being provided. Leakage current through the tube electrodes is read on meter $M_1$ through current limiting resistor $R_{13}$ when switch $S_1$ is in its No. 3 position and the short-leakage switch 44 is turned to a leakage testing position. With $S_1$ in its No. 2 position meter $M_1$ operates as a voltmeter with preadjusted series resistor $R_{12}$ to read the output potential of the D.C. supply +. Heater potential is supplied to the socket heater terminals from transformer winding $W_3$ through switch 44 and electrode switches 38 and 39.

The signal generator 10 is designed to provide a high order of stability notwithstanding heater voltage variation. It comprises a single thermionic triode 48 operating in conjunction with a small transformer 49 having an insulated output winding 50 which connects the generator 10 to the signal voltage divider $R_5$, $R_y$, $R_3$, $R_2$, $R_1$, as also shown in FIG. 2. In FIG. 2, only the output winding 50 of transformer 49 of the generator 10 is illustrated, the winding 50 serving as a signal source. The winding 50 supplies a signal current of magnitude $i_g$ through the adjustable output control resistor $R_5$ to the serially connected voltage divider resistors $R_1$, $R_2$, $R_3$ and $R_y$, providing appropriately related grid signal voltages for the various ranges of mutual conductance.

The amplifier-detector 6, 46 may include vacuum tubes or transistors. In one commercial embodiment of the invention two thermionic triodes are used in amplifier 6 with a crystal rectifier bridge 46 to provide adequate gain for full scale deflection of the meter $M_1$. Pass band characteristics for the amplifier 6 may be achieved in conventional manner such as through the use of tuned inductance-capacitance filters or by simple resistance-capacitance networks.

The well known relation between the grid input voltage and the plate current resulting therefrom, for a linear portion of the tube characteristic, is:

$$i_p = \frac{\mu e_g}{R_p + r} \quad (1)$$

where $i_p$ and $e_g$ are the plate current and grid input voltage respectively,
$R_p$ is the impedance of the tube,
$r$ is the additional resistance in the plate circuit which includes the instrument or shunt resistance, and
$\mu$ is the amplification factor.

By dividing numerator and denominator by $\mu$, the equation becomes:

$$i_p = \frac{e_g}{\frac{R_p}{\mu} + \frac{r}{\mu}} \quad (2)$$

Now it is also well known that:

$$\frac{\mu}{R_p}$$

is equal to the mutual conductance of the tube $G_m$.
Therefore, $$i_p = \frac{e_g}{\frac{1}{G_m} + \frac{r}{\mu}} \quad (3)$$

If $r$ is zero or is maintained at a low value, then the $$\frac{r}{\mu}$$

factor may be neglected in Equation 3 and the simple relation exists:

$$G_m = \frac{i_p}{e_g} \quad (4)$$

In FIG. 2 let,
$e_g$ = control grid signal voltage,
$i_g$ = signal current from generator output winding 50,
$i_p$ = signal produced alternating component of the plate current,
$R_1$, $R_2$, $R_3$ and $R_y$ are divider resistors in the grid signal circuit.

With the range switch $S_1$ in its No. 1 position, instead of its No. 2 position, as shown, the signal voltage $e_g$ applied to the control grid of the tube 33 is equal to the product of the signal current and the resistance $R_1$, or $$e_g = i_g R_1 \quad (5)$$

Substituting 5 in 4:

$$G_m = \frac{i_p}{i_g R_1} \quad (6)$$

Retaining the range switch $S_1$ in its No. 1 position, and with the calibration switch $S_2$ in its No. 1 or "calibrate" position, the output control resistor $R_5$ is so adjusted that the meter $M_1$ indicates precisely full scale. This is a calibration reading and assures a predetermined reference magnitude for $i_g$ which takes into account the amplification of amplifier 6 and other factors. Under these calibration conditions:
Then, $$i_g R_1 = i_p R_4 \quad (7)$$

By substituting 7 in 6

$$G_m = \frac{i_p}{i_p R_4} = \frac{1}{R_4}$$

This value of $G_m$, which is determined solely by $R_4$, corresponds to full scale deflection of the meter $M_1$ and the mutual conductance scale of the meter $M_1$ is calibrated accordingly with this value of $G_m$ indicated for full scale deflection. The calibration switch $S_2$ is then shifted to its No. 2 or measurement position and a reading will be obtained which is less than full scale. If the reading exceeds full scale, the range switch $S_1$ is shifted as explained below to obtain a larger value of $G_m$ for full scale deflection. The mutual conductance of the tube under test is read directly from the calibrated scale with reference to the full scale mutal conductance value as determined by the range switch $S_1$.

It should be noted that, if conditions remain unchanged, the resultant $G_m$ indication on meter $M_1$ when switch $S_2$ is returned to position 2 is dependent only on the mutual conductance of the tube 33 under test and the constant resistance value of the measurement resistor $R_4$. Thus the accuracy of indication involves the original accuracy and stability of resistors in the grid and plate circuits and is independent of any gradual changes in the gain of the electronic amplifier, the sensitivity of the meter or the amplitude of the grid signal.

If, for example, we select $R_4$ as 10.0 ohms and set the sensitivity of the amplifier-detector 6 to read 500 microamperes, which is full scale deflection on meter $M_1$, then the voltage sensitivity of this combination at the signal frequency will be 5 millivolts. We may then select $R_1$ as 1.00 ohms. At balance when resistor $R_5$ has been set to meet the requirements of Equation 5, $i_g$ will equal 5 milliamperes.

Then from 6

$$G_m = \frac{.0005}{.005 \times 1} = .1 \text{ mho} = 100{,}000 \text{ michromhos}$$

for full scale deflection of $M_1$.

We may for a second range select $R_2$ as equal to 9.0 ohms.

Then $$G_{m_2} = \frac{i_p}{e_g} = \frac{i_p}{i_g \times [R_1 + R_2]}$$

or $$G_{m_2} = \frac{.0005}{.005 \times [1+9]} = .01 \text{ mho} = 10{,}000 \text{ micromhos}$$

for full scale deflection of $M_1$.

Resistors $R_3$ and $R_y$ may be used for additional mutual conductance ranges. In practice they would be calculated and adjusted to provide even multiples or decades to fit the scale numbers on meter $M_1$. Capacitors $C_1$, $C_2$ and $C_3$ are of sufficient capacity to have approximately zero impedance at the signal frequency. The tube 33 under test is shown as a conventional pentode, but the same circuit may be used for measuring the mutual or grid to plate transconductance of triodes, tetrodes and the like. For simplification of the diagram, the heater connections have been omitted, and the screen and plate energizing circuits have been represented by batteries $B_1$ and $B_2$.

The design of the power supply circuits provides a D.C. anode supply with good regulation along with the grid bias, leakage test, signal generator and electronic micromho meter energizing circuits all supplied by a single common transformer. Thus with careful design and production control of the interrelated transformer potentials, a single adjustment of master potentiometer $R_6$ will bring all of the D.C. potentials into the correct predetermined relationship. Meter $M_1$ is used with a calibrated series resistor $R_{12}$ as a D.C. voltmeter in this operation for determining the correct setting of master adjustment potentiometer $R_6$. For this purpose, meter switch $S_{11}$ is moved to its No. 2 position. Power line voltage variations and also heater and anode load variations will be reflected as changes in the full terminal voltage of tapped transformer winding $W_4$, and through the action of rectifier $CR_3$ will be apparent on meter $M_1$. All rectifiers shown are of the solid state type which exhibit exceptionally low forward resistance, and therefore introduce a minimum of effective internal resistance into the energizing circuits.

Transformer winding $W_2$ energizes the negative supply designated — for the leakage test and control grid circuits through rectifier $CR_2$ and filter capacitor $C_5$. A potentiometer $R_7$ is adjustable by a knob including a dial 22 (FIG. 3) which is calibrated directly in volts. Adjustment of the potentiometer $R_7$ varies the grid bias applied to the tube under test via a conductor 15, signal generator winding 50, $G_m$ range switch $S_1$, resistor $R_{18}$, the grid portion of short-leakage switch 44 and electrode switch 35. A grid voltage selecting pole 51 of a four pole eleven position switch $S_{10}$ selectively short circuits a resistor $R_8$ in a voltage divider circuit $R_9$, $R_8$, $R_7$ energized from the — supply. Short circuiting the resistor $R_8$ increases the current through potentiometer $R_7$ to provide two ranges of grid potential. In a preferred embodiment of the invention, $R_7$ with switch pole 51 in the open position covers a bias range of zero to five volts, and with pole 51 closed, $R_7$ covers a range of zero to 50 volts. Thus pole 51 may operate as a decade multiplier for $R_7$.

Transformer winding $W_3$ is tapped to permit the selection of appropriate energizing voltages for the anode and screen circuits. With switch $S_6$ in the right hand or D.C. position, energy is fed from a tap changing pole 52 of the selector switch $S_{10}$ and switch $S_6$ to a full-wave rectifier $CR_1$ the negative output terminal of which is grounded. A filter capacitor $C_2$ is connected across the output of rectifier $CR_1$. The positive terminal of rectifier $CR_1$ is connected to the anode of the tube under test through the load resistor $R_4$, switch $S_2$, switch $S_7$, resistor $R_{19}$, short-leakage switch 44 and the electrode switch 41. Selector switch $S_{10}$ includes a screen voltage selecting pole 53 which is connected to the screen of the tube 33 under test through short-leakage switch 44 and electrode switch 40. Pole 53 connects the screen electrode of the tube either directly to the output of rectifier $CR_1$ to receive its full output voltage or to a voltage divider comprising serially connected resistors $R_{10}$ and $R_{11}$ to receive a reduced screen voltage. The reduced voltage output circuit is shunted by a filter capacitor $C_3$ to reduce ripple voltage and provide a low impedance to ground. Capacitor $C_2$ is chosen to be of sufficient capacitance to maintain a steady and reasonably ripple-free D.C. potential for both anode and screen grid circuits. As the combined load increases, there will be an increasing ripple voltage in the plate circuit at double the power line frequency, that is, 120 cycles if the equipment is energized from a 60 cycle source. The band pass characteristics of the amplifier-detectors 6, 46 are designed to provide a high rejection ratio of power supply ripple current and its harmonics with respect to signal current so that the accuracy of meter readings will be unaffected by this ripple current. The use of a signal frequency which is considerably above power line or ripple frequency makes it quite practical to separate the two currents even with a very sensitive high gain amplifier connected in the anode circuit of the tube which is being tested for mutual conductance.

Switch $S_7$ may be shifted from position 1, as shown, to position 2 and switch $S_6$ changed from the D.C. to the A.C. position for supplying alternating current to energize the anode circuits of rectifiers, diodes and gas discharge tubes where tests using A.C. plate voltage are required. For these A.C. tests, switch $S_7$ is placed in its No. 2 position and meter switch $S_{11}$ is placed in its No. 5 position. This connects resistor $R_{19}$ across meter $M_1$ as a shunt, the meter $M_1$ being provided with a corresponding scale calibrated in milliamperes. A different current range for meter $M_1$ may be obtained by moving switch $S_{11}$ to its No. 4 position which connects resistor $R_{17}$ as a shunt instead of resistor $R_{19}$. With either $R_{17}$ or $R_{19}$ operating as a shunt, the meter $M_1$ is connected to read the average value of the half wave rectified anode current resulting from a given setting of the voltage selector switch $S_{10}$. The pole 54 of switch $S_{10}$ operates to select various current limiting resistors while the pole 52 simultaneously selects one of the four available A.C. energizing voltages for the anode of the tube under test. Current limiting resistor $R_{14}$ is serially included in the anode energizing current in all positions of pole 54 and is the only current limiting resistor which is operative in switch positions Nos. 7 and 11 of switch $S_{10}$. In positions Nos. 1, 2, 4, 5 and 9, all three current limiting resistors $R_{14}$, $R_{15}$ and $R_{16}$ are serially included in the anode energizing circuit. In positions Nos. 3, 6 and 10, resistors $R_{14}$ and $R_{15}$, in series with each other, are operative to limit the anode current. Position No. 8 is not used for these A.C. plate current tests.

Plate current with D.C. energization can be measured by shifting switch $S_6$ to its D.C. position and selecting the desired shunt for meter $M_1$ by positioning switch $S_{11}$ in its No. 4 or No. 5 position, depending upon the desired full scale meter reading in milliamperes. The anode voltage is selected by pole 52, the screen voltage by pole 53 and the grid voltage by pole 51 and calibrated potentiometer $R_7$.

The transformer $T_1$ includes a tapped secondary winding $W_4$ which is connected through a selector switch $S_9$ to supply a preselected filament or heater voltage to the tube under test. As shown in FIG. 1, the selected heater voltage is supplied through electrode switches 38 and 39 to the heater of the tube 33 which is positioned in the test socket 31.

As described above the + supply from the half-wave rectifier $CR_3$ is filtered by capacitor $C_4$. Capacitor $C_4$ is dimensioned to provide a reasonably ripple-free D.C. supply for energizing the anode circuits of signal generator 10 and band pass amplifier 6. By moving the meter switch to its No. 2 position, the meter $M_1$ is connected to the + supply for operation as a voltmeter. There is a reference mark (not shown) on the scale of meter $M_1$. By adjusting the master voltage control potentiometer $R_6$ in the circuit of transformer primary winding $W_1$ to bring the needle of the meter to the reference mark, compensation for line voltage variation is obtained. Since the + supply is obtained directly from the transformer secondary winding $W_4$, the corrective adjustment of master control potentiometer $R_6$ in the primary circuit provides a corresponding corrective voltage adjustment in all circuits of the testing apparatus. This is because the entire apparatus is energized exclusively by the three secondary windings $W_2$, $W_3$ and $W_4$, all of which are coupled to the primary winding $W_1$ of transformer $T_1$ and subject to voltage adjustment by the master control potentiometer $R_6$.

Referring to the voltage selector switch $S_{10}$, it will be observed that the potential available at the A.C.–D.C. switch $S_6$ increases as the pole 52 is moved from position No. 1 to position No. 11. At position No. 1, a low voltage is available; at positions Nos. 2 and 3, the voltage is of medium value; in positions Nos. 4 through 7 a medium high voltage is provided and a high voltage is obtained in positions Nos. 8 through 11. In the four high voltage positions Nos. 8 through 11, pole 53 selects the full screen voltage in positions Nos. 10 and 11 and a reduced voltage in positions Nos. 8 and 9. The full screen voltage is equal to the plate voltage and changes when the plate voltage is changed. The reduced screen voltage is, in each instance, a fixed fraction of the full plate voltage which is determined by the voltage divider $R_{10}$, $R_{11}$. With either full or reduced screen voltage, a high or low voltage range may be selected by pole 51 for the grid bias potentiometer $R_7$, while the selected screen voltage is retained and the high plate voltage likewise remains unchanged.

This situation is repeated for the medium high voltage positions Nos. 4 through 7 of voltage selector switch $S_{10}$. For the medium plate voltage selected in positions Nos. 2 and 3, only the low grid bias range is available, there being a choice between full and reduced screen voltages. In position No. 1 of switch $S_{10}$ only full screen voltage and reduced grid bias are available together with low plate voltage from pole 52 of the switch.

Expected or normal control grid currents for thermionic receiving tubes are generally in the order of a fraction to two or three microamperes. Currents of this order can be measured with the circuitry as shown in simplified form in FIG. 3. The tube 33 under test is shown supplied with normal plate, screen and bias energizing potentials. $R_7$ is the same potentiometer calibrated in volts as previously described. Meter $M_1$, a D.C. microammeter as previously shown in other diagrams is connected across a shunt $R_{19}$ in the plate supply lead, and reads the D.C. or static plate current drawn by the tube. By opening switch $S_8$, a resistor $R_{18}$, shunted by a capacitor 55, can be inserted in the grid circuit without disturbing other conditions. If the tube draws appreciable grid current there will be a change in the $M_1$ meter reading.

Assume a value of 1 megohm for $R_{18}$. A current of 1 microampere in this circuit would result in a 1 volt change in grid potential. To determine the magnitude of the grid current, the reading in milliamperes is first noted on meter $M_1$ with switch $S_8$ closed and also the bias dial reading is noted in volts. Switch $S_8$ is opened and the bias dial is rotated in the correct direction to return the plate current to the original $M_1$ reading. The difference between the two bias dial readings is noted in volts, and is equal to the grid current in microamperes drawn by the tube.

What is claimed is:

1. Apparatus for measuring the mutual conductance of a thermionic tube having at least an anode, a control grid and a cathode, said apparatus comprising:

a measurement resistor which is connected directly to the anode of said tube during mutual conductance measurement, the resistance of said measurement resistor having a low value with respect to the anode-cathode impedance of said tube;

first circuit means for applying a standard predetermined direct current anode potential to said anode through said measurement resistor, said anode potential being positive with respect to ground;

means for grounding said cathode;

second circuit means for supplying a standard predetermined direct current biasing potential to said grid;

third circuit means including a signal source having a predetermined signal frequency for applying a signal potential to said grid along with said biasing potential;

manually operable adjustment means included in said third circuit means for varying the magnitude of said signal potential;

a plurality of resistors included in said third circuit means for simultaneously obtaining a plurality of proportionally related potentials from said signal source for the same adjustment of said adjustment means;

a tuned indicator responsive predominantly to potentials of said signal frequency, said indicator including a calibrated scale;

two-position switching means having calibrating and measuring positions for selectively connecting said indicator either to a predetermined reference point in said third circuit means to receive a calibrating potential therefrom or to the junction between said anode and said measurement resistor to receive a current of signal frequency amplified by said tube; and range selecting switching means connected to said resistors for supplying a selected one of said proportionally related potentials to said grid whereby, when said adjustment means is manipulated to provide a predetermined reference reading on said scale with said two position switching means in its calibrating position, said two position switching means may be operated to its measuring position and the mutual conductance of said tube read from said scale using a constant of proportionality, said constant of proportionality being determined by the positioning of said range selecting switching means.

2. A tube tester for tubes having at least an anode, a cathode and control grid, said tester comprising:
   a transformer core;
   a primary winding arranged on said core for energizing the same;
   an alternating current energizing circuit for said primary winding;
   manually adjustable compensating means included in said energizing circuit for adjusting the magnitude of energization of said core by said primary winding to compensate for changes in the voltage of said energizing circuit;
   a plurality of secondary windings arranged on said core for energization thereby;
   a plurality of rectifier means;
   a plurality of filter means each connected to the output of one of said rectifier means, each filter means consisting essentially of resistive and capacitative circuit elements;
   said rectifier means and filter means being separately energized by said secondary windings;
   an oscillator for generating a test current having a frequency higher than the frequency of said alternating current and distinguishable from harmonics thereof, said oscillator being energized by at least one of said secondary windings and through at least one of said rectifier and filter means;
   a mutual conductance measuring circuit employing said oscillator, said measuring circuit including band-pass filter means for selecting currents having the frequency of said test current from other currents and detector means for rectifying the currents selected by said band pass filter means;
   a direct current measuring instrument;
   anode potential deriving circuit means energized by at least one of said secondary windings through at least one of said filter means;
   grid bias potential deriving circuit means energized by at least one of said secondary windings through at least one of said filter means;
   and multi-position switching means interconnecting a tube under test, said measuring instrument, said potential deriving means and said mutual conductance measuring circuit, said switching means being selectively operable to connect said measuring instrument to measure either the anode current of said tube or the mutual conductance thereof during energization of said tube with an anode potential and a grid bias selected by said switching means.

3. A tester for various different vacuum tubes each having at least an anode, a cathode, a control grid and a screen grid, said tester comprising:
   an alternating current energizing circuit;
   a transformer core;
   a primary winding on said core, said primary winding being connected to said energizing circuit for energization thereby;
   a plurality of secondary windings on said core, a first one of said windings having a plurality of taps providing different voltages;
   first manually operable multi-position switch means connected to said taps of said first winding;
   a cathode heater energizing circuit connected to said first winding and to said first switch means for energizing the cathode heater of a tube under test at a voltage selected by said first switch means;
   a second one of said secondary windings having a plurality of taps providing different voltages;
   second manually operable multi-position switch means having a plurality of separate poles, each pole comprising a movable contact and plurality of stationary contacts each separately engageable by said movable contact in one of the positions of said second switch means, a plurality of said taps of said second winding each being connected to a separate group of adjacent stationary contacts of a first one of said poles;
   rectifier means connected to the movable contact of said first pole;
   a capacitor connected to filter the output of said rectifier means;
   an anode energizing circuit connected to the output of said rectifier means;
   voltage reducing means connected to the output of said rectifier means for obtaining a plurality of different voltages, said voltage reducing means being connected to supply said voltages to separate groups of adjacent stationary contacts of a second one of said poles, said last-named stationary contacts being arranged to permit the selection of a plurality of different voltages by the movable contact of said second pole simultaneously with a particular voltage for said anode energizing circuit;
   a screen grid energizing circuit connected to the movable contact of said second pole;
   further rectifier means connected for energization by one of said secondary windings;
   further voltage reducing means connected to said further rectifier means, said further voltage reducing means being connected to the stationary contacts of a third pole of said second switch means, the stationary contacts of said third switch means being arranged to apply different voltages to the movable contact of said third pole simultaneously with different combinations of voltages for said anode and screen grid circuits;
   a control grid biasing circuit connected to said third pole;
   an indicating instrument;
   a mutual conductance measuring circuit;
   and further manually operable switch means for connecting said measuring circuit and said instrument to measure the mutual conductance of a tube under test with anode, screen grid and control grid potentials selected by said second switch means, said further switch means permitting said instrument to be connected to measure the anode current of said tube under test independently of said measuring circuit with anode, screen grid and control grid potentials selected by said second switch means.

4. A tester according to claim 3 further comprising manually operable means connected to said primary winding for varying the voltage supplied by said alternating current energizing circuit to said primary winding, and wherein said further switch means is operable to connect said instrument for the indication of a voltage derived from one of said secondary windings whereby said manually operable adjusting means may be manipulated to provide predetermined fixed voltages from said secondary windings notwithstanding variations in the voltage of said alternating current energizing circuit.

5. A tester according to claim 3, further comprising adjustable voltage compensating means included in said alternating current energizing circuit for varying the energization of said primary winding thereby;
   means included in said further switching means for connecting said indicating instrument for measurement of a voltage derived from one of said secondary windings whereby said last-named voltage may be adjusted to a predetermined desired value by operation of said compensating means notwithstanding variations in the voltage of said energizing circuit;
   and a potentiometer connected in said control grid biasing circuit, said potentiometer having a movable potentiometer contact connected to vary the potential applied to the control grid of a tube under test by displacement of said potentiometer contact;

a scale and a cooperating index connected to said potentiometer contact for displacement therewith, said scale and index being calibrated to indicate the potential in volts applied to the control grid of a tube under test with said compensating means adjusted to provide said predetermined desired value for said voltage derived from said secondary winding.

6. A tube tester according to claim 5 further comprising a grid-current resistor of predetermined resistance and means included in said further manually operable switch means for connecting said last-named resistor in series between said movable potentiometer contact and said control grid of said tube under test.

7. A tube tester according to claim 2 further comprising a network of resistors having terminals for deriving a plurality of voltages therefrom which are related by at least one precisely predetermined ratio, said oscillator being connected to energize said network; means included in said multi-position switching means for selectively connecting said mutual conductance measuring circuit to said network terminals for employment of said oscillator by said measuring circuit; and manually operable means for adjusting the magnitude of the output of said oscillator.

8. A tube tester according to claim 3, further comprising a current limiting resistor; two-position switching means for connecting said current limiting resistor to said first pole of said second manually operable multi-position switch means independently of said first-named rectifier means and for connecting the anode of said tube under test for energization from a transformer tap selected by the movable contact of said first pole of said second switching means through said current limiting resistor; a meter shunt connected in series with said current limiting resistor; and means included in said further manually operable switch means for connecting said instrument across said meter shunt.

9. Apparatus according to claim 1, further comprising:
a transformer including a primary winding, a tapped secondary winding and a further secondary winding;
a multi-pole multi-position switch, one pole of said multi-position switch being connected with said tapped secondary winding to select a particular voltage therefrom;

rectifier and filter means connected to said one pole for energization by said particular voltage, said one pole and said rectifier and filter means being included in said first circuit means to provide said anode potential;

further rectifier and filter means connected to said further secondary winding for energization therefrom; and a voltage divider network connected to the output of said further rectifier and filter means, said divider network including a potentiometer having a scale calibrated in volts and a separate resistor which is connected to another pole of said multi-position switch to be short circuited thereby in certain positions thereof, said separator resistor, when short circuited, increasing the current flow through said potentiometer whereby a multiplication factor is applied to the readings of said potentiometer scale to change the range thereof, said potentiometer being included in said second circuit means to provide said biasing potential, said multi-pole multi-position switch being connected to select different combinations of anode potentials and grid bias ranges in various positions thereof.

References Cited by the Examiner
UNITED STATES PATENTS

| | | | |
|---|---|---|---|
| 2,053,101 | 9/36 | Olesen | 324—27 |
| 2,075,415 | 3/37 | Williams | 324—27 |
| 2,083,357 | 6/37 | Barton | 324—27 |
| 2,456,833 | 12/48 | Morelock | 324—27 |
| 2,914,719 | 11/59 | Walton | 321—8 |
| 2,973,473 | 2/61 | Oakes et al. | 324—26 |

OTHER REFERENCES

Philbrook: A Portable Thyratron Test, pages 46, 47, 48 of Radio and Television News, February 1957.

Push-Button Transconductance Tester, published by Electronic Design, Mar. 1, 1956, vol. 4, No. 5, pages 24 and 25.

SAMUEL BERNSTEIN, *Examiner.*

WALTER L. CARLSON, *Primary Examiner.*